Nov. 17, 1953   D. A. CUSANO ET AL   2,659,678
TRANSPARENT LUMINESCENT SCREEN AND METHOD
FOR PREPARING SAME
Filed Aug. 23, 1951

Inventors:
Dominic A. Cusano,
Frank J. Studer,
by Paul A. Frank
Their Attorney.

Patented Nov. 17, 1953

2,659,678

UNITED STATES PATENT OFFICE 2,659,678

TRANSPARENT LUMINESCENT SCREEN AND METHOD FOR PREPARING SAME

Dominic A. Cusano and Frank J. Studer, Schenectady, N. Y., assignors to General Electric Company, a corporation of New York Application August 23, 1951, Serial No. 243,272

6 Claims. (Cl. 117—33.5)

The present invention relates to luminescent screens, as for example, screens for cathode ray tubes on which luminous images are produced by cathode rays. It is the object of our present invention to improve the uniformity of such screens.

In a prior application Serial No. 200,908, filed by us on December 15, 1950 (and assigned to the same assignee as the present application), we have described improved cathode ray screens which are glassy and transparent. Such screens contrasted with cathode ray screens heretofore commonly used which were powdery in appearance and were light-scattering. The transparent screens as described in said application, may be prepared by causing to be deposited on a suitable support, for example, a glass plate, a screen composition in which the metallic constituent consists either of zinc or cadmium alone, of an admixture of these metals and in which a combining ingredient consists either of sulfur or selenium. Such composition suitably activated is deposited on a suitable base as a transparent film. For example, a stream of either zinc vapor, or zinc chloride vapor, admixed with a small amount of manganese chloride, is caused to mingle with hydrogen sulfide gas in contact with a glass base or foundation which is heated to about 400 or 600° C. Ideally, a clear transparent film of zinc sulfide is deposited on the glass foundation under these conditions.

Sometimes, due to obscure causes, the films which were thus produced were not uniformly transparent. Powdery spots or partially-opaque regions appeared thereon. As such spots would decrease the clarity and efficiency of image production, they were undesirable.

In accordance with our present invention which includes both a process and a product thereof, improved screens are provided having uniform-clear transparency, even when of large area. They are produced by precoating the base with a thin film of manganese sulfide preliminary to the deposition of an image-forming film.

Figure 1:
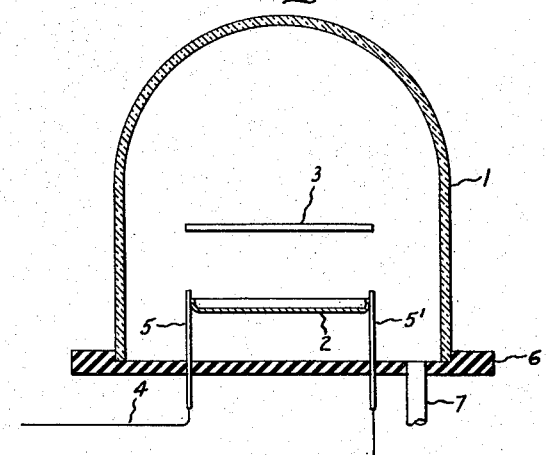
Figure 2:
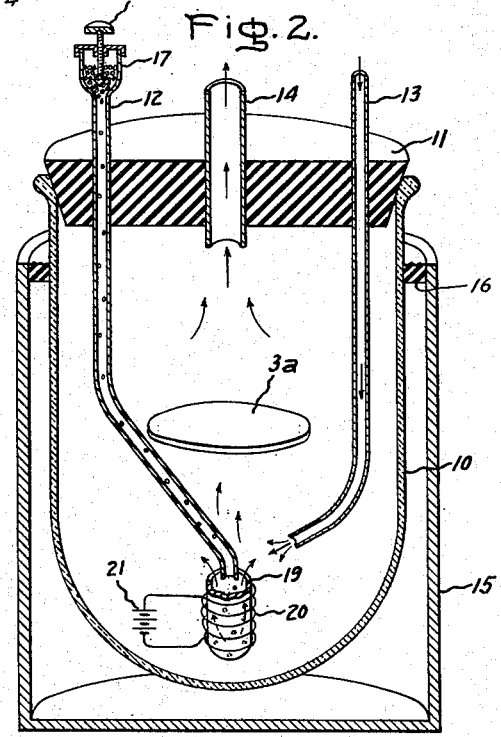
Figure 3:
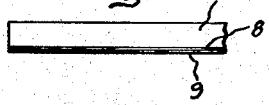

The accompanying drawing shows an apparatus for carrying out our invention. Fig. 1 is a diagrammatic longitudinal section of a vaporization chamber for depositing a film of metallic manganese; Fig. 2 similarly shows a longitudinal section of a reaction apparatus in which the deposition of superimposed film of cathode ray responsive material constituting the second phase of fabrication of the present article may be carried out; and Fig. 3 is a fragmental sectional view of a portion of a completed screen.

In Fig. 1 is shown a deposition chamber 1 in which is located a vaporizer 2 for furnishing manganese vapor to be deposited on a suitable foundation. The foundation may consist of a plate or disk 3 of refractory glass or fused quartz. When coated as later described, the plate 1 eventually becomes a part of a cathode ray apparatus. The plate support has not been shown in order to simplify the drawing. The source of heat may be of any convenient form, and here is represented by the current supply wires 4, 4', whereby heating energy is conveyed to the terminals 5, 5' of the resistance-heated vaporizer 2.

The boat-shaped vaporizer 2 may consist of tungsten, molybdenum or other suitable refractory conductor. In the vaporizer is contained a charge of metallic manganese, or a reaction mixture capable of yielding metallic manganese. The deposition chamber is closed by a suitable insulative plate 6, through which passes a conduit 7, whereby the chamber 1 may be evacuated preparatory to the deposition of manganese.

By raising the temperature of the vaporizer to the volatilization temperature of manganese, namely about 1200 to 1500° C. manganese vapor is evolved from the vaporizer 2, and is condensed on the plate 3 as a thin film. The resulting film of manganese sulfide on the plate 3 should have a thickness in the approximate range of 0.001 to 0.1 micron. A film of such thinness is transparent and light-transmitting. The plate now coated with manganese, and for distinction designated as 3a, is immediately and quickly transferred to an apparatus such as shown in Fig. 2, where the film on 3a is converted to a sulfide film. To accomplish this conversion the plate 3a is exposed to hydrogen sulfide gas in the treating chamber 10 while heated to a temperature of about 400-600° C. The hydrogen sulfide gas is supplied by a conduit 13. Over a surface of a film 8, Fig. 3, thus produced, luminescent-activated zinc sulfide or equivalent screen material may be deposited as a uniform transparent film 9 without the occurrence of powdery opaque areas.

The apparatus for depositing the luminescent film is described in our previously-identified prior application and is identical to the apparatus shown in Fig. 2. It comprises a treating chamber 10 which is closed by a cover 11 through which pass conduits 12, 13 for the supply of reacting materials and a conduit 14 for the exhaust of by-products as indicated by the arrows. The treating chamber 10 is surrounded by a heating chamber or oven 15, the heat supply not being shown. The closure 16 for the oven 15 may be used or omitted.

Referring to Fig. 2, zinc, or zinc-yielding material, contained in a hopper 17 are introduced into the conduit 12 by the feeding device 18 and from thence is supplied to a vaporizer 19. The vaporizer may consist of suitable refractory non-metallic material, as for example, alundum or quartz and is heated by an externally-wound resistor 20, supplied with electric current by a source 21.

Vapor, of zinc or zinc chloride is caused to arise from the vaporizer 19 and to chemically react with hydrogen sulfide at the surface of the plate 3a, thereby causing zinc sulfide to be deposited as a transparent film 9 on the plate 3a over the film 8 of manganese sulfide.

This operation is carried out with the reaction chamber 10 heated to about 500 to 600° C. The vaporizer 19 should be heated to a temperature sufficiently high to vaporize the charge supplied, thereto, that is, zinc or zinc chloride, ordinarily to about 750° C.

An activator of cathode ray-excited luminescence, such as manganese, silver, copper, zinc or aluminum, may be associated with the zinc or zinc-yielding material, a fractional per cent being sufficient. The addition of activator is dispensable when manganese activation is desired, as apparently some manganese from the underlying base film of manganese sulfide enters the zinc sulfide film overlying the base film and, thereby, activates the zinc sulfide film. However, we prefer to associate the zinc vapor during deposition with a suitable activator such as manganese chloride, when the effect of a manganese activator is desired.

In place of the transparent zinc sulfide film 9, Fig. 3, similar transparent activated sulfide or selenide films of cadmium and zinc-cadmium mixtures may be deposited over the manganese sulfide film, such films and their production being described in our prior application, Serial No. 200,908.

In Fig. 3, the films 8 and 9 are indicated as having a distinct demarkation. We believe that substantial blending occurs of the two layers. Even when no activator has been added, the overlying film 9 is activated by an undercoat of manganese sulfide which indicates that to some extent, at least, the superimposed film becomes associated with some of the substances of the foundation film.

What we claim as new and desire to secure by Letters Patent of the United States is:

1. A luminescent screen comprising a transparent base, a transparent film thereon comprising manganese sulfide and having a maximum thickness of the order of 0.1 micron, and a superimposed transparent film consisting of a compound of metal selected from the group consisting of zinc, cadmium and mixtures thereof which metal is chemically combined with non-metallic element selected from the group consisting of sulfur, selenium and mixtures thereof.

2. A luminescent screen comprising a base of transparent material, a light-transmitting film thereon consisting of manganese sulfide having a maximum thickness of the order of 0.1 micron, and an overlying film of transparent activated zinc sulfide.

3. A cathode ray screen comprising the combination of a base of transparent material, a film of manganese sulfide thereon having a thickness in the approximate range of 0.001 to 0.1 micron and being substantially transparent and a superimposed film of transparent activated zinc sulfide.

4. A cathode ray image-forming screen comprising the combination of a glass plate, a substantially-transparent film of manganese sulfide thereon having a thickness in the approximate range of 0.001 to 0.1 micron and a superimposed sulfide film containing as a combined constituent metal selected from the group consisting of zinc, cadmium and mixtures thereof.

5. The method of fabricating a transparent luminescent cathode ray tube screen which comprises the steps carried out at reduced pressure of depositing on a transparent base a film of metallic manganese by condensation of manganese vapor, converting said film to the sulfide of manganese and depositing on the resultant sulfide film an activated second film consisting of a compound made up of metal selected from the group consisting of zinc, cadmium and mixtures thereof chemically combined with non-metal selected from the group consisting of sulfur, selenium and mixtures thereof during and by a chemical reaction carried out at reduced pressure between vapors of the selected metal and selected non-metal adjacent the surface of said manganese sulfide film.

6. The method of fabricating a cathode ray screen which comprises the steps of depositing a film of manganese on a transparent base by condensation thereon of manganese vapor at reduced pressure, reacting the resulting film with hydrogen sulfide to convert said manganese film to a transparent manganese sulfide film, simultaneously evolving in an enclosed space adjacent the resulting sulfide film and at about 500 to 600° C. hydrogen sulfide gas together with vapor selected from the group consisting of zinc, cadmium mixtures thereof and chlorides thereof whereby sulfide is formed and deposited and exhausting by-products of the resulting reaction from said space.

DOMINIC A. CUSANO.
FRANK J. STUDER.

References Cited in the file of this patent

UNITED STATES PATENTS

| Number | Name | Date |
|---|---|---|
| 2,161,458 | De Boer et al. | June 6, 1939 |
| 2,280,939 | Weinhart | Apr. 28, 1942 |
| 2,462,517 | Leverenz | Feb. 22, 1949 |
| 2,542,122 | Ellefson | Feb. 20, 1951 |